United States Patent [19]
Friedell

[11] 3,902,694
[45] Sept. 2, 1975

[54] SWINGING SPHERICAL GATE VALVE AND DOUBLE SEAL QUICK DISCONNECT COUPLING

[76] Inventor: Morley V. Friedell, 3705 Hoyt St., Wheat Ridge, Colo. 80033

[22] Filed: Mar. 5, 1974

[21] Appl. No.: 448,439

[52] U.S. Cl. .................. 251/58; 251/163; 251/192; 251/308; 137/614
[51] Int. Cl.² ...................... F16K 25/00; F16K 1/22
[58] Field of Search ........... 251/162, 163, 308, 304, 251/188, 192, 315, 367, 298, 299, 301, 300, 12, 58; 137/315, 614, 454.2

[56] References Cited
UNITED STATES PATENTS

| | | | |
|---|---|---|---|
| 3,067,978 | 12/1962 | Natho | 137/315 X |
| 3,123,334 | 3/1964 | Hitz | 251/300 X |
| 3,191,906 | 6/1965 | Zeigler et al. | 251/304 X |
| 3,475,003 | 10/1969 | Paluszek | 251/163 |
| 3,498,583 | 3/1970 | Friedell | 251/308 X |
| 3,675,894 | 7/1972 | Friedell | 251/308 X |
| 3,732,885 | 5/1973 | Allen | 137/315 |

Primary Examiner—Martin P. Schwadron
Assistant Examiner—Robert J. Miller
Attorney, Agent, or Firm—Phillip L. DeArment; Gay Chin; Donald E. Zinn

[57] ABSTRACT

The inner, gate rotating shaft of a pair of concentric shafts on a driving side of a spherical valve housing rotates a valve gate freely supported for rotation on the same side by the outer, translation shaft of the pair and on the driven side by a single translation shaft. Both translation shafts have an eccentric portion about which the gate valve rotates. An arcuate torsion beam is mechanically coupled at its ends to the two translation shafts and lies to the side of the spherical valve housing opposite that of the gate. By selectively locking the gate rotating lever and driving the gate translation lever or vice versa, the spherical gate is rotated freely about the stationary translation shafts to and from a position outside of the flow path and at right angles thereto or axially cammed into contact with a coaxial valve seat by rotation of both translation shafts. A plurality of overcenter locking clamps couple abutting ends of two such valves to effect a double seal, quick disconnect for a fluid line which couples or disconnects without axial movement.

17 Claims, 13 Drawing Figures

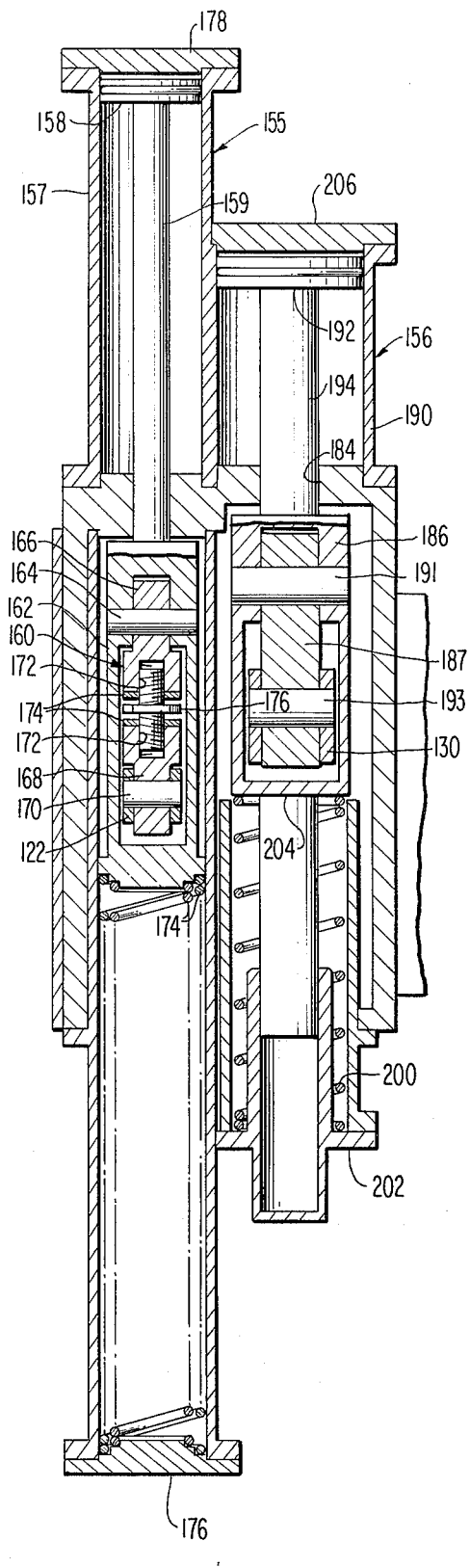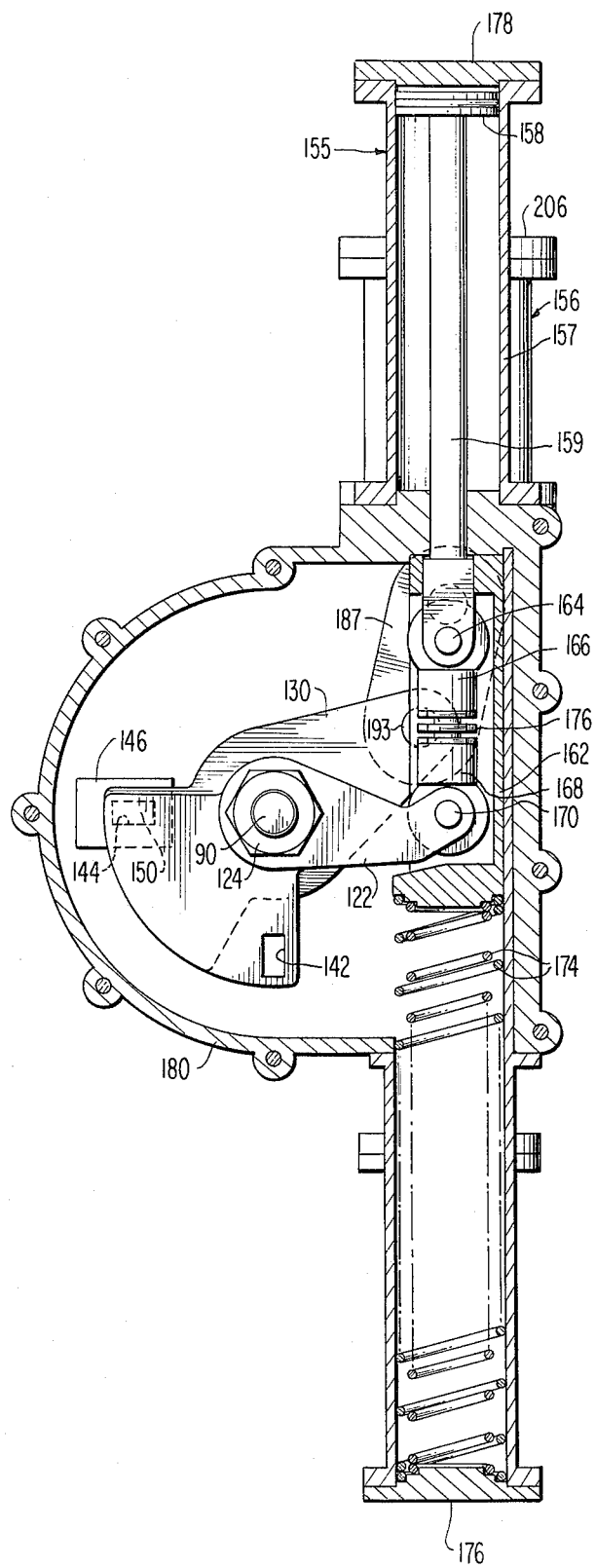

SWINGING SPHERICAL GATE VALVE AND DOUBLE SEAL QUICK DISCONNECT COUPLING

BACKGROUND OF THE INVENTION

1. Field of the Invention

This invention relates to a swinging, spherical gate valve employing compound movement between open and closed positions, and more particularly, to a valve of this type which provides a clean and unrestricted flow path with fast actuation between open and closed positions, and additionally, to the employment of two similar valves to effect a double seal, fluid line disconnect, which couples or disconnects without axial movement.

2. Description of the Prior Art

This invention constitutes an improvement upon my prior U.S. Pat. Nos. 3,498,583 and 3,675,894 directed to swinging gate valves which involve compound movement to effect movement of the valve gate or poppet from an open position to the side of the flow path to a closed position generally at right angles thereto and translated axially relative to a coaxial annular valve seat to effect a sealed closure.

In U.S. Pat. No. 3,675,894, a spherical segment or "eyelid" drops completely out of the flow stream into a spherical pocket in the side of the valve housing. The valve is supported by a rotatable shaft with the shaft in turn being supported by opposed bearings on opposite sides of the valve body such that its axis passes through the center of curvature of the semispherical body. The eyelid rests within the pocket supported on said shaft by rotatable and axially shiftable support links, and a control plate and guide plate controls the extent of angular rotation of the support links and the axial extension of the links and the valve after rotation, to a position coaxially with the flow path, to effect sealing of the eyelid against the circular valve seat. Eccentric means effect axial shifting of the eyelid disc and the support links when the eyelid is coaxially positioned with respect to that valve seat. The eyelid or spherical gate valve common to that patent and this application requires less power to operate, is compact and lighter in weight and capable of very much faster response than the prior art gate and ball valves. Since the eyelid drops out of the flow path in each case, the valves are characterized by small profile, low pressure drop, positive seal engagement between the gate and the valve seat and low leakage. Such valves may be advantageously employed in all areas of fluid handling, particularly high pressure hydraulic control systems. The valves are highly useful in petroleum plants and transport lines using "pigs" or air filled rubber bladders, to isolate various commodities being pumped such as diesel fuel, followed by regular gasoline, and each type is followed by one or more pigs. Thus, the valve which controls fluid flow through the transport lines must be free of any internal obstructions which impede the travel of or damage to the pig, otherwise, the isolation is lost. Conventional gate or ball valves require high power and most large gate valves have a wide gate slot which is detrimental to the passage of the pig.

One aspect of the present invention is to provide an improved swinging spherical gate valve in which there is no obstruction to flow and no support or drive mechanism extending through the flow stream.

When used in a petroleum plant or transport system, provision must be made for pig insertion and retrieval. At the beginning and end of the transport line, as well as at intermediate delivery points, pigs must be inserted or removed from the line. Presently, a flange bolted door is opened in a Y branch, the pig is inserted, and the door bolt is shut. The valve is open at the time of the commodity change and the pig is blown into the main line by compressed air, separating the two commodities.

Another aspect of the present invention is to provide an improved swinging spherical gate valve employable in a petroleum plant or liquid transport system, which eliminates the necessity for a second main valve and which provides ready access to the flow path in a fast and expeditious manner.

Where the petroleum transport system is of the type such as the Trans-Alaska Pipeline and the pipeline is of high concern to ecologists and environmentalists, not only from the standpoint of the heat of the oil and mounting on the permafrost, but is also of great concern in terms of the possibilities of ruptures and vast oil spills, such lines of necessity will utilize huge pigs to isolate commodities, primarily crudes from various participating companies. The present invention, therefore, has additional use as a remote control or automatic safety valve in the event of break or rupture with the valve.

In the cryogenic and vacuum field, there exists the necessity for providing a coupling between line sections characterized by positive seal engagement and low leakage and wherein both portions the coupling of respective line sections carry valves which insure line section sealing prior to disconnect.

The present invention, when employing two identical valves except for locating and locking interface, provides face to face coupling permitting coupling or disconnect without axial movement, and the invention is characterized by an improved, overcenter cam lock clamping mechanism to achieve this end.

SUMMARY OF THE INVENTION

The present invention is directed in part to a swinging gate valve of the type where a spherical gate is pivoted within a spherical valve housing from a first, axially in line, position with respect to an annular valve seat to a second valve open position at an angle thereto and outside the axial flow path through the seat opening, and means are provided for axially shifting said gate when in axial alignment with said opening to fully close said valve on said seat.

The improvement resides in opposed, aligned, eccentric driving and driven shaft means carried by said housing to each side of said flow path and coupled to and supporting said gate for rotation about the axes of said shaft means and torsion beam means coupling said eccentric driving and driven shaft means for forcibly camming of said gate axially toward said valve seat, and means for driving said driving shaft means. The torsion beam comprises an arcuate member spanning the housing interior outside of the flow path and to the side of the flow path opposite the spherical gate and is coupled at respective ends to the eccentric driving and driven shaft means. The valve housing carries a cylindrical flow guide tube, cantilever fixed to the inlet end, coaxial with the annular valve seat with the free end spaced therefrom a distance permitting rotary movement of the valve gate to a position in axial alignment with the guide tube and the annular valve seat for further camming to fully closed position.

The driving shaft means comprises concentric shafts at one side of the housing. Locking means selectively lock one of the concentric shafts against rotation while permitting the other to rotate and vice versa. First and second reciprocating fluid motors are operatively coupled to the concentric shafts for rotating the valve gate and translating it axially into contact with valve seat against the bias of the torsion beam. Return springs bias the fluid motors to positions with the valve fully open. The means coupling one of the reciprocating fluid motors to the gate rotating shaft comprises a turnbuckle permitting the adjustment of the extent of arcuate movement of the valve gate between the first and second rotary positions.

The selective locking means for the concentric drive shaft takes the form of a shuttle bar guide positioned between respective levers and having a shuttle bar carried thereby and slots are formed within the levers to allow the shuttle bar to move axially to positions such that portions are cammed during rotation of a given lever to positions within the guide member and the other lever to alternately lock the gate rotary lever in a fixed position while releasing the translation lever and vice versa.

The spherical valve housing comprises a two part housing including a first section of relatively short length with respect to the axial flow path with the flow guide tube fixed to the short length section and extending in a cantilever manner the major length of the longer section, whereby removal of the short section permits ready access to the valve gate and the torsion bar due to the removal of the flow guide tube.

The invention is further directed to a double seal, quick disconnect fluid coupling which comprises, preferably, a pair of spherical gate valves as described above, each having its spherical housing terminating in axially extending cylindrical portions defining annular locating and locking interfaces for face to face confrontation. One of the cylindrical portions forms a radially outwardly projecting seal clamp ring, and the cylindrical portion of the other valve housing carries a plurality of cam lock clamps on its periphery at circumferentially spaced positions and extending longitudinally thereof. Each cam lock clamp comprises a cam shaft including an eccentric portion rotatably supported on the housing cylindrical portion for rotation about an axis tangential to the housing and at right angles to the axis of the housing cylindrical portion. An integral hook-shaped clamp extending radially outward of the shaft eccentric portion has its hooked end adapted to engage the side of the seal clamp ring opposite the contact interface. Actuators for rotating the cam shafts to move each clamp between open and closed position comprise a plurality of reciprocating motors fixed to the outer periphery of the valve housing aligned with the clamps and provided with a slide reciprocable about a path overlying the pivot axis of pivot arms operatively coupled to the clamp cam shafts and extending radially thereof while links are pivotably coupled, respectively, to the slide and to the pivot arm. The position of the link relative to said slide and the position of said arm relative to the eccentric portion of said cam shaft is such that the eccentric is overcentered with respect to the contact point between the hook and the seal clamp ring, and said link and slide are at right angles to each other when said valve housings are clamped axially to each other.

Preferably, an axial recess is provided within the side of the seal clamp ring remote from the contact interface and adjacent to the outer periphery of the cylindrical portion of the valve housing and the hooked end of the cam lock clamp terminates in a reversely directed nose configured and dimensioned similar to that of the axial recess such that clamping force is exerted by the clamp on the seal clamp ring at said recess to prevent separation of the spherical valve by either axial or radial forces acting thereon. The clamp cam shafts are mechanically interconnected throughout the circumference of the valve housing by universal joints to insure simultaneous action of all clamps and preferably the actuators are one-half in number to the clamps and are circumferentially positioned between alternating pairs of cam lock clamps and are mechanically coupled therewith by way of said universal joints.

BRIEF DESCRIPTION OF THE DRAWINGS

FIG. 6 is a sectional view of the hydraulic drive mechanism of the left hand valve of the disconnect of FIG. 1 taken about line 6—6.

FIG. 7 is a sectional view of the hydraulic drive mechanism of FIG. 6, and at right angles thereto.

DESCRIPTION OF THE PREFERRED EMBODIMENT

Figure 1:
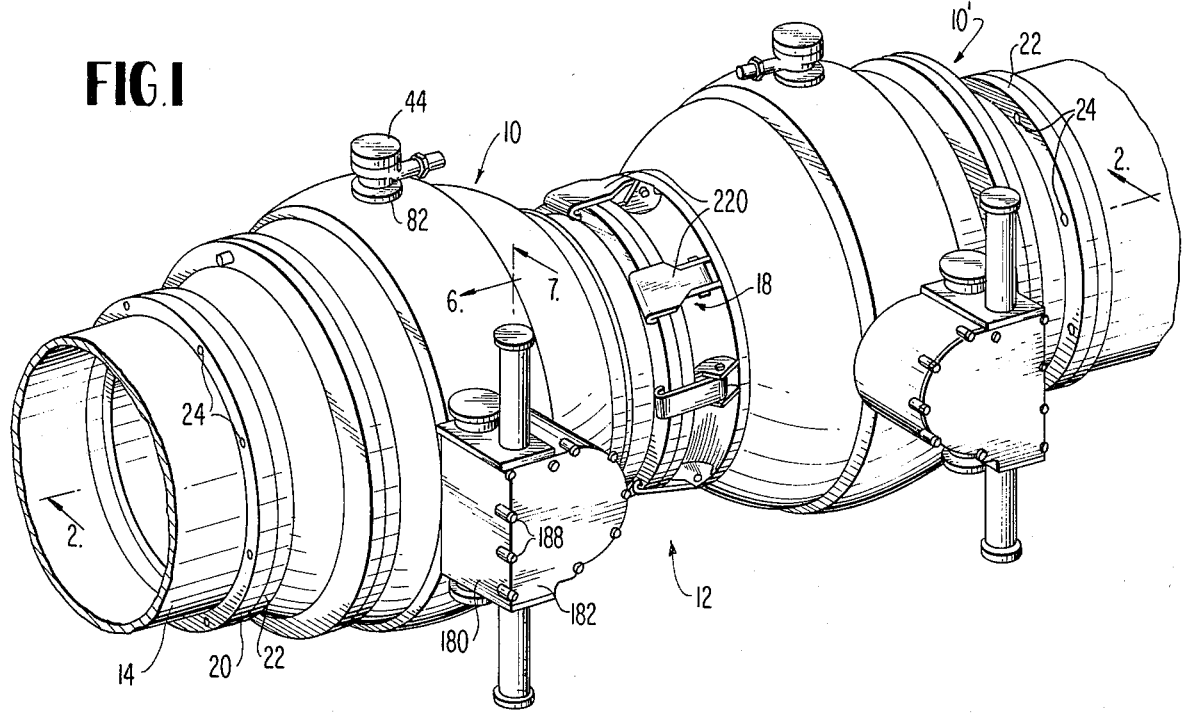
FIG. 1 is a perspective view of a quick disconnect, multi-valve coupling forming one aspect of the present invention between two sections of a fluid line incorporating a pair of swinging spherical gate valves forming a second aspect of the present invention.

Turning to the drawings, FIG. 1 shows a pair of swinging spherical gate valves of the present invention at 10 and 10' forming the left and right hand portions of a double seal, disconnect coupling 12 for a liquid or gaseous line formed by pipe sections 14 and 16. The two valves 10 and 10' are essentially identical except for locating and locking interfaces and being mounted face to face, and are secured together with an overcenter cam lock clamping mechanism indicated generally at 18. Mounting flanges 20 of the pipeline sections 14 and 16 are directly connected to end flanges 22 of valves 10 and 10' by means of a plurality of bolts 24.

Turning to FIGS. 2–7 inclusive, the make-up and design of the improved swinging spherical gate valves may be readily appreciated. Each valve has components made principally of metal such as stainless steel, and consists of a two piece spherical shaped housing including an inlet section or portion 26 and an outlet section 28. Since the valves 10 and 10' are essentially identical except with respect to their coupling portions, the description of valve 10 will suffice for valve 10' except for details relating to the coupling therebetween and identical elements are given identical numerical designations.

The inlet housing section 26, in addition to being provided with a first radial flange 22 which includes an inner peripheral recess 30 for receiving a sealing element (not shown), such as an O-ring, is provided with a second radial flange 32 which mates with flange 34 of the outlet section 28. A number of mounting screws 36 couple flanges 32 and 34 in conventional fashion with flange 34 being tapped and threaded to facilitate the connection. Sections 26 and 28 define a spherical valve housing cavity 38. Section 28 of the housing is provided with threaded bore 40 which receives the threaded end 42 of a locking pin mechanism or assembly 44. This assembly consists of a nipple 46 carried by casing 48 which permits a fluid to enter a cylinder 49 which is closed off by way of end cap 50 and which holds a piston 52 from which extends a locking pin 54, received within bore 56 of assembly casing 48. Locking pin 54 is therefore gravity positioned within cylinder 48 and normally falls to the position shown in FIG. 2 with its projecting end received within a cylindrical recess 59 formed within the periphery of spherical "eyelid" or valve gate 58 when the gate is moved to full valve open position. Each gate 58 consists essentially of a segment of a sphere formed of light weight metal and being provided with integral arms 60 to either side thereof. The arms 60 straddle the exterior of a flow guide tube 61 which is coaxially positioned within the valve housing.

In this respect, housing section 26 is provided with an inner peripheral recess defining a shoulder 64 against which one end 66 of the flow guide tube 61 abuts and is supported in cantilever manner by means (not shown). The other end 68 of tube 61 is spaced from housing section 28 so as to form a gap 69 therebetween. This permits the eyelid or gate 58 to pivot from a position located within the spherical housing cavity 38 and out of the flow path to a position at right angles thereto, that is, transversely to the flow path and overlying the outlet end 68 of the flow guide tube 61. Housing section 28 is stepped at 70 and terminates in a cylinder portion 72. Step 70 forms an annular recess 73 which receives and holds, by way of seat retaining ring 74, an annular Teflon valve seat 75. The inner diameter of cylinder portion 72 conforms to the diameter of flow guide tube 61. Cylinder portion 72 terminates in a seal clamp ring 76 of enlarged radial diameter forming end face 78 which carries an annular recess 80 at the base of ring 76. The seal clamp ring 76 cooperates with the cam lock clamps of assembly 18 to be described hereinafter.

Thus, each valve such as valve 10, is comprised of its two part housing consisting of sections 26 and 28, to allow the assembly of the valve components. The outlet section 28, to the side of the straight cylinder portion 72, enlarges into a full spherical contour. Boss 82 of this section receives the locking pin assembly 44, FIG. 3, and bosses 80 are provided at the center of the spherical radius to receive bearing adaptors 84 and 86 respectively on the left or driving side of the valve and on the right or driven side of the valve, FIG. 3. These bearings adaptors are essentially machined cylinders which are bolted to the boss 80 by means (not shown). The drive end adaptor 84 is machined to receive two anti-friction bearings 88 which support for rotation a pair of concentric driving shafts constituting an inner, gate rotating shaft 90 and an outer gate translation shaft 92. The gate rotating shaft 90 is provided on its inner end with an integral gate rotating arm 94 terminating in a gate rotating arm lug 96 which is received within recess 98 of the drive side gate pivot arm 60 to drive the arm 60. Thus, rotation of the gate rotating shaft 90 effects pivoting of the valve gate 58 between a first, open position, that is, behind the flow guide tube 61 and within spherical cavity 38, outside of the flow path, to a second position overlying the outlet end 68 of the flow guide tube 61 and in axial alignment with the Teflon valve seat 75. The bearing adaptor 84 is further machined to receive dynamic face seal 100. A second translation shaft 102 is provided on the driven side of the valve supported within bearing adaptor 86 on paired anti-friction bearings 104. Both translation shaft 92 and translation shaft 102 have eccentrics 106 machined on their inner ends to receive the antifriction bearings 108 of the gate pivot arms 60. Integral arms 116 and 118, respectively, of translation shafts 92 and 102 extend radially thereof and are bolted to respective ends of an arcuate torsion beam 120 by bolts 121 such that the two translation shafts are coupled together by the torsion beam.

On the drive side of the machine, both the gate rotating shaft 90 and the translation shaft 92 extend outwardly of the bearing adaptor 84 with the gate rotating shaft 90 extending axially beyond the gate translation shaft 92. The end of the gate rotating shaft 90 is splined at 91 and has splined thereto, a gate rotating drive lever 122. A clamping nut 124 and thrust washer 126 locks the gate rotating drive lever to the shaft 90 and also maintains a dynamic face seal 128 in position with respect to the outer end of the driving side gate translation shaft 92. A gate translation drive lever 130 is also splined to the translation shaft 92 with all bearings, sleeves and lever 130 secured together with a clamping nut 132. On the driven side, the bearings 104 and a thrust washer 134 are secured to shaft 102 by a similar clamping nut 136. Gate rotating lever 122 is provided with an integral control plate 138 and translation drive lever 130 is similarly provided with integral control plate 140. Each control plate is slotted as at 142 and 144, respectively, with the sides of the slots beveled oppositely to form cam surfaces and the sides of the shuttle bar beveled at opposed ends to act as cam followers. Fixed to the bearing adaptor 84 is a shuttle bar guide 146, FIG. 4, which is likewise slotted at 148 and retains a shuttle bar 150. Spring 154 spans slot 148 and is fixed at the center to bar 150 and at its ends to the sidewalls of the guide 146 to bias the shuttle bar to an intermediate position and shifted to either side thereof by the cams of control plates 138, 140.

There is provided a pneumatic operating system in this case, although an electric drive is appropriate where slower operation is desired. The pneumatic system of the illustrated embodiment consists of a pair of double acting pneumatic motors of the reciprocating type identified generally at 155 and 156 respectively, FIGS. 6 and 7. Each of the pneumatic reciprocating motors are spring returned for fail open operation. In this respect, the pneumatic motor 155 constitutes a long stroke, lower power cylinder comprising cylinder 157 which houses piston 158 and which in turn, through piston rod 159, drives gate rotating lever 122 by means of turnbuckle adjusting assembly 160.

In this regard, rod 159 terminates in a cross head slide 162 supporting a pivot pin 164 which in turn receives a first threaded female member 166 of the turnbuckle, while the second threaded female member 168 is pin connected to the gate rotating lever 122 via pin 170. Threaded bores 172 of both of these members receive respective threaded ends 174 of adjustment nut 176. The rotation of the adjustment nut 176 relative to members 166 and 170 effects axial spacing between rod 159 and the gate rotating lever 122. Slide 162 is hollowed to receive the turnbuckle adjustment mechanism 160. The lower face of the slide 162 is radially stepped to receive one end of two concentric springs 174 which are concentrically mounted within the lower end of the long stroke power cylinder 157. The bottom ends of coil springs 174 abut a step end plug 176. End plugs 176 and 178 are carried at respective ends of the long stroke lower power cylinder 154 by fixing means (not shown). The springs tend to bias slide 162 which rides within cylinder 157, upwardly to a position where the piston 158 abuts the upper end plug 178. Preferably, a cover 182 overlies the outer surface of housing 180 which carries motor 155, and is bolted thereto by means of bolts 188 to permit access to the interior of this portion of the valve.

In addition to the long stroke, lower power pneumatic reciprocating motor 155, there is provided a high power (larger area) short stroke reciprocating fluid motor as at 156 which is also incorporated within housing 180. Motor 156 is characterized by a larger diameter cylinder 190 carrying reciprocating piston 192 fixed to one end of piston rod 194 which in turn extends through housing bore 184 and terminates in slide 186. Link 187 is pinned by pin 191 to slide 186 and by pin 193 to gate translation lever 130. Slide 186 rides within a cylinder 190, which is concentric thereto but spaced therefrom slightly and of slightly larger diameter so as to receive a coil return spring 200 which bears upon flange 202 forming a radial extension of cylinder 190 and the bottom 204 of the slide 186 to bias the slide 186 and piston 192 towards the top of cylinder 190 and in contact with an end cap 206. Application of fluid pressure, in this case a pneumatic force, to the upper side of piston 192 tends to drive the gate translation lever 130 in a clockwise direction, FIG. 7, against the bias of coil spring 200, tending to cam the eyelid against the valve seat once the eyelid is in a position coaxial with the axis of the valve seat. As indicated, antifriction bearings are employed at all pivot points. The linkage is designed to rotate the gate 58 in the case of each valve, exactly 90°, with precise adjustment screw 176 to variably space sections of the turnbuckle 166 and 168 relative to each other in an axial direction.

Gate translation lever 130 is coupled to the piston rod 194 by means of a simple pivot link 186 and rotates the translation shaft 92 a maximum of 60°. Housing 180 constitutes a protective enclosure for these elements with cylinders 157 and 190 protruding therefrom.

Figure 2:
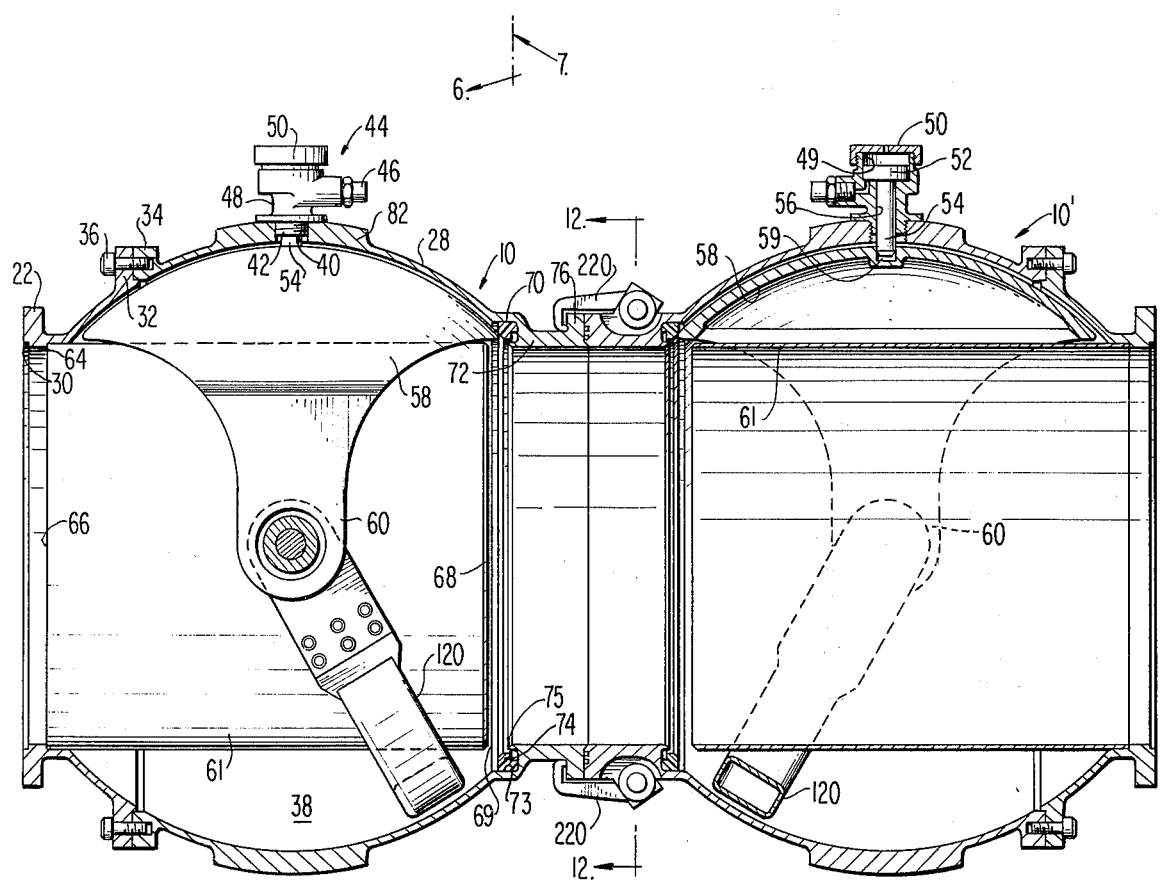
FIG. 2 is a sectional, elevational view of the double seal, quick disconnect valve coupling of the present invention of FIG. 1 taken about line 2—2.
Figure 3:
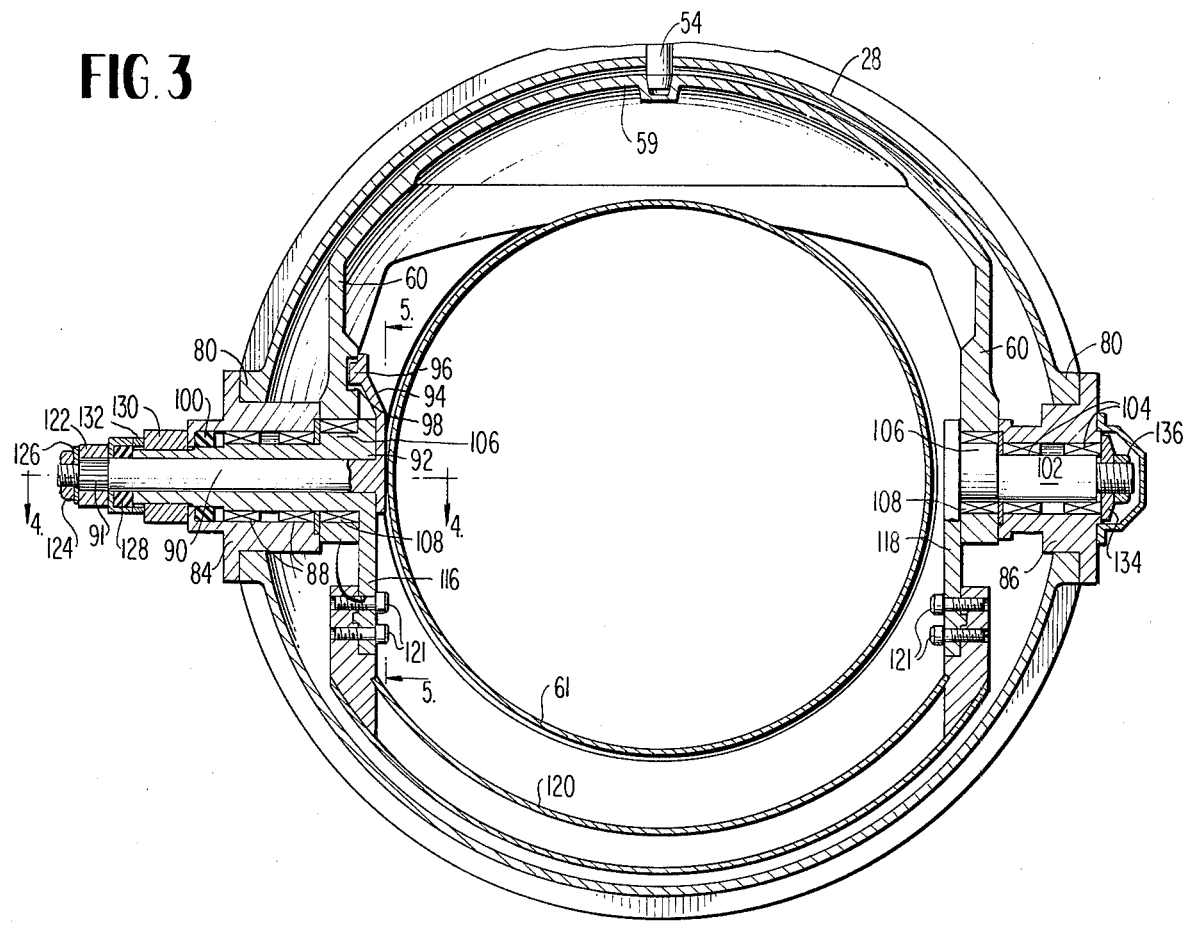
FIG. 3 is a transverse sectional view of one of the valves shown in FIGS. 1 and 2.

Another important aspect of the invention resides in the cam lock clamp disconnect mechanism 18. In FIGS. 1 and 2, purposely, the actuating mechanism for the individual cam lock clamps 220 has been deleted from the drawings. However, further reference to FIGS. 12 and 13 not only show the details of the clamp in terms of enlargement of the views, but also fully disclose the actuating mechanisms 246 for effecting cam locking through the employment of eccentric means and as overcenter link connection between the fluid motor achieving locking and unlocking and the eccentric shaft which is rotated thereby.

The cylindrical portions 72 and 72', respectively, of valves 10 and 10' terminate in axially abutting end faces 222 and 224 respectively, end face 222 for valve 10 defining the female coupling member by reason of the peripheral recess 226, while end face 224 is oppositely configured to provide a slight axial projection about its periphery as at 228. One of the end faces such as end face 224 of valve 10' is further provided with one or more annular grooves being shown which are concentric and spaced from each other. The grooves receive O-ring seals 232 or the like. Thus, it is apparent that when the valves are coaxially positioned and moved into end face abutment with each other, the two valves are capable of connection and disconnection without axial movement of the valves, once positioned. A plurality of cam lock clamps 220 are carried by the straight line cylindrical portion 72' of valve 10' and engage the seal clamp ring of the other valve 10. In the illustrated embodiment, valve 10' carries eight such clamps circumferentially spaced about the outer periphery of the cylindrical portion 72, each clamp being pivotably mounted on paired brackets 234 which extend radially outwards of the valve housing section. Housing section 28 has its surface scalloped annularly as at 236 to facilitate pivoting of each clamp about a pivot axis defined by the eccentric portion 240 of shafts 238 which span the brackets and which are integral with the individual clamps at their inboard ends.

Figure 12:
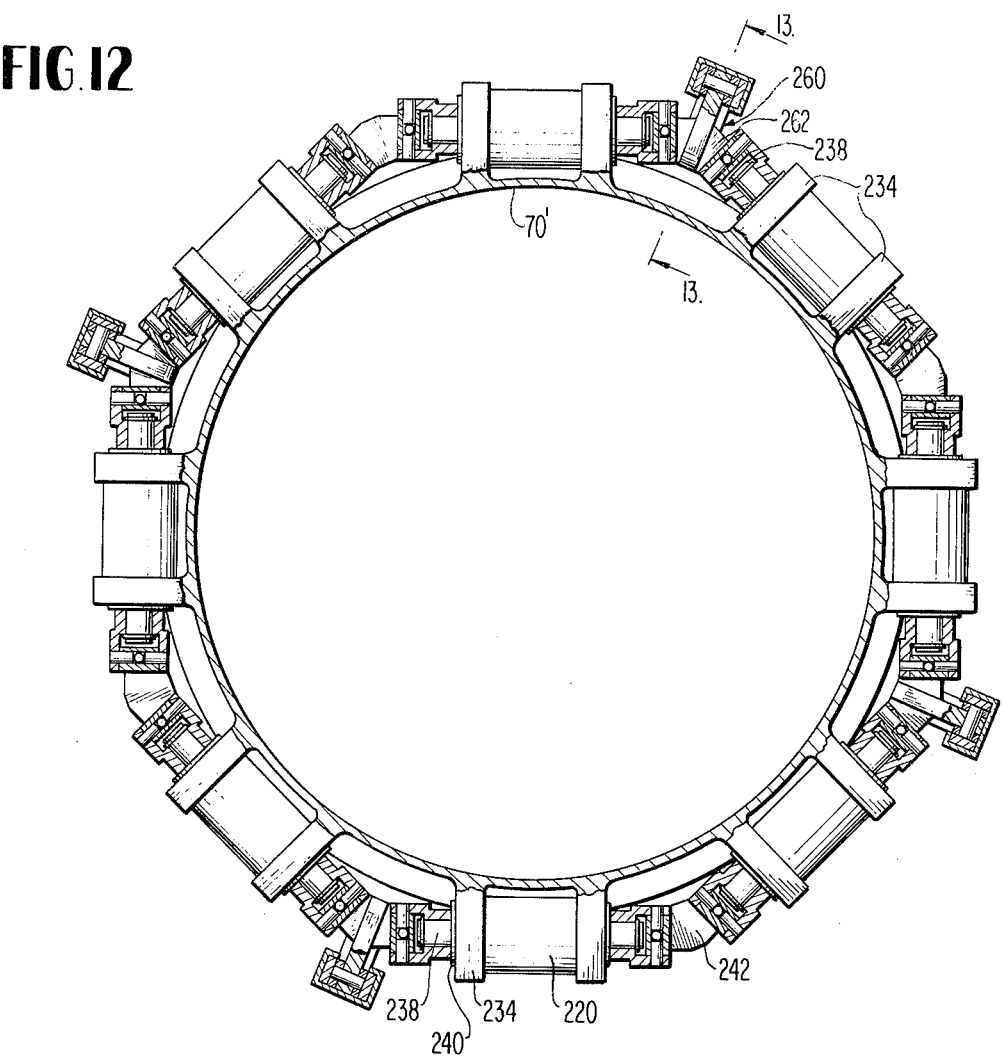
FIG. 12 is an end view of a portion of one of the valves forming the disconnect of FIG. 1, partly in section.
Figure 13:
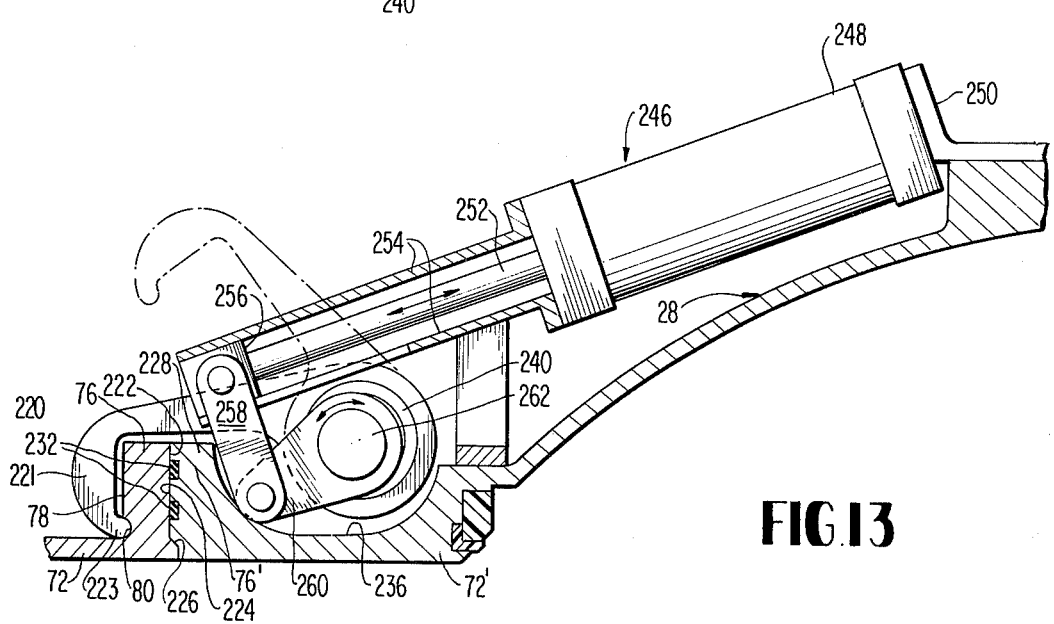
FIG. 13 is a sectional view of a portion of the valve of FIG. 12, taken about lines 13—13.

Reference to FIGS. 12 and 13 shows the eight cam lock clamps 220 mounted by way of brackets 234 which are preferably integrally cast or machined from the valve housing. Each clamp 220 is rotatably mounted within brackets 234 on the eccentric portion 240 of a drive shaft 238 with limited rotation being permitted for the drive shaft, this being achieved by a slot in the clamp bearing area and a pin in the shaft (not shown) which allows the clamp to rotate 90° with respect to the shaft. Further, preferably, a torsion spring (not shown) or other means urges each clamp toward the extended position. The drive shafts 238 are all coupled to each other by universal joints 242. The actuators number four in the illustrated embodiments, that is, one-half the number of the cam lock clamps 220. The actuators 246 are more clearly shown in FIG. 13; the illustrated actuator being exemplary of a mechanism for achieving rotation of the drive shaft 230 which permits some limited lateral movement of each clamp 220 relative to the axis of shaft 238 as well as rotation thereabout, limited to 90°. The actuator comprises a reciprocating fluid motor fixed at one end by means of mounting bracket 250 to the outer periphery of section 28 of the spherical valve housing with the axis of the fluid motor lying generally tangentially thereto and in line with the longitudinal axis of the cam lock clamps. The piston (not shown) internal of the cylinder 248, for each actuator, is coupled to the piston rod 252 which extends outwardly and between guide members 254, and is attached, at its outer end, to a slide 256. Thus, operation of the fluid motor 246 results in the slide 256 being moved to the right or left as indicated by the double headed arrow, FIG. 13. The slide 256 is pin connected to a link 258 which, in turn, is pin connected to a pivot arm 260. Arm 260 is rigidly coupled to drive shaft 262, thus reciprocation of the slide 256 causes rotary oscillation of its drive shaft 262 about its axis.

The seal clamp ring 76 which projects radially outwards of the cylinder portion 72 of housing section 28 of valve 10 has its annular recess 80 facing nose 223 of the hooked end 221 of each clamp 220. This permits force application axially to press faces 222 and 224 of the respective valves together.

The actuator is coupled to the clamps on either side thereof through a respective universal joint 242 which connects all of the clamps together such that oscillation of the pivot arm 260 at each actuator location causes similar rotation of each cam drive shaft 238 about its axis as defined by mounting bracket 234. At each actuating lever universal joint, an actuator in the form of a reciprocating fluid motor 246, will move the shaft 262 through 150° of rotation by means of link 258 and slide 256. This motion is transmitted to cam drive shafts 238 to each side thereof. As may be seen by FIG. 13, in the final lock position with the nose 223 engaged within axial recess 80 on the rear face of the seal clamp ring 76, the eccentric 240 is overcentered about 5° to provide a locking condition, and the link 258 and slide 256 are also in a locking mode by being at right angles to each other. Thus, regardless of vibration or other factors tending to disrupt the sealed coupling between the valves, the overcenter condition of the actuator mechanism of the drive mechanism prevents any possible opening of the cam lock clamp in an expeditious manner.

Figure 8:
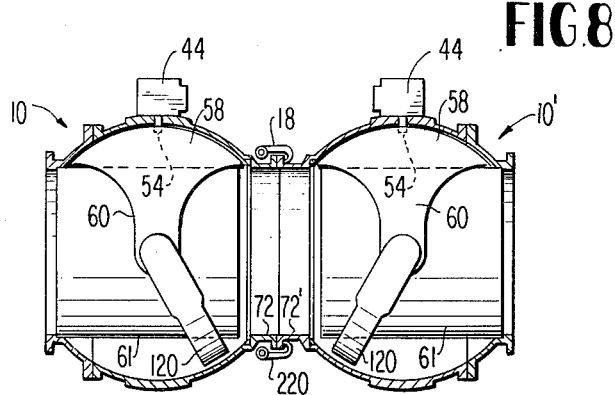
FIG. 8 is a longitudinal sectional view of the quick disconnect of FIG. 1, reduced in size, showing both valves in line coupled, valve open position.
Figure 9:
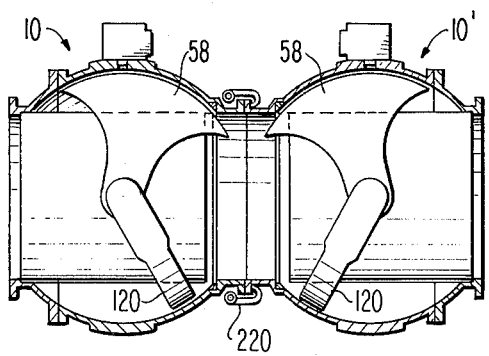
FIG. 9 is a similar sectional view to that of FIG. 8 with the valves partially moved toward valve closed position.

The operation of each valve is identical and the sequence of valve operation and also the operation of the double seal quick disconnect line coupling by employing two such valves may be readily appreciated by further reference to FIGS. 8-11 taken in conjunction with the Figures previously referred to. In FIG. 8, the valve is shown in open position and this figure corresponds to FIG. 2. The gate 58 for each valve lies within the spherical cavity 38 behind the flow guide 61, locked in place by the gate lock mechanims 44. The lock mechanism 44 is not only intended to prevent inadvertent closing of the valve, but also to support the gate during extreme vibration conditions as it may be subjected to in particular applications. Where the system requirements are such that there are no external influences which would tend to close the valve, a simple operating lever detent may be employed in lieu of the fluid operated gate lock mechanism 44 illustrated. Such lock mechanisms as 44 have application as anti-sabotage devices in critical ground operations.

Figure 4:
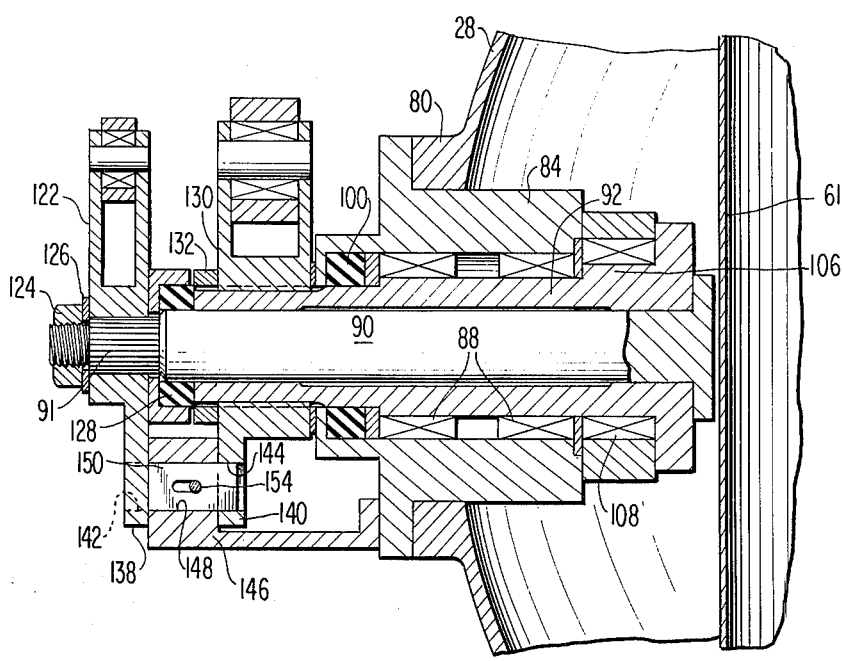
FIG. 4 is an enlarged, sectional view of a portion of the valve shown in FIG. 3 taken about line 4—4.

The valve closing sequence begins with the lock mechanism 44 pulling the pin under the application of applied fluid pressure through nipple 46, thus causing the pin 54 to move upwardly out of the recess within gate 58. A sequencing valve (not shown) sends compressed gas to the outer end of the gate rotating cylinder 157 which acts on the face of piston 158 to move the gate against the bias of the multiple return springs 174, in the sequence illustrated by FIGS. 8, 9 and 10, to a position where the gate 58 is in direct axial alignment with the outlet valve seat 75. The linkage including the gate rotating lever 122 is designed to smoothly decelerate the gate by having the final angle of the shaft arm 94 and the direction of motion of the cylinder slide 162 parallel to each other. At this final point of rotation, the slot 142 of the gate rotating lever 122 aligns with the shuttle bar 150 and spring biasing means 154 shifts the bar 150 to mid position, the translation lever 130 having previously been locked in retracted position. Reference to FIG. 4 shows the shuttle bar 150 slidably mounted within a conformed slot 148, shuttle bar guide 146 being permitted limited axial movement controlled by the cams of slots 142 and 144. The bar 150 has its ends, at this point in time, within slot 144 of the translation lever 130 and within slot 142 of the gate rotating lever 122, respectively. This locks both levers together and insures movement of one with respect to the other. At this point, a second sequence valve (not shown) which is operated by the gate rotating fluid motor 155, then applies pressure to the outer end of piston 192.

Prior to unlocking of the gate translating lever 130, movement of the gate rotating lever 122 causes low friction rotation of arms 60 and eyelid 58 about bearings 108 and the eccentric portions 106 of translation shafts 92 and 102 coupled together by torsion beam 120. Release of the translation lever 130 and rotation of its control plate 140 cams the shuttle bar 150 to the left to lock the gate rotating lever 122 and releases the translation lever. The rotation of both translation shafts 92 and 102 and their eccentric portions drive the gate 58 axially into pressure contact against the Teflon seat 75 which it faces but from which it was spaced slightly prior to operation of fluid motor 156. The torsion beam 120 transmits this rotational force to the opposite side of the valve, thus causing the shaft 102 to follow this movement and to uniformly move the gate axially into valve sealing position. The head pressure acting on the inside of the eyelid then completes the seal. The complete reversal of the procedure is required to re-open the valve. That is, the gate or eyelid 58 must be retracted, the shutter bar 150 is released from the gate rotating lever 122 and locks the translation lever 130 and the gate 58 is swung completely out of the flow stream as and to the side of the guide tube 61 and realigned with the locking pin 54.

The torsion beam 120 which provides the means to operate both translation shafts and eccentrics simultaneously operates in the spherical portion of the housing opposite the area in which the gate is housed. The beam swings through a maximum arc of 60° as seen in the sequence from FIGS. 8-10, in the same direction as the rotation of the gate 58 and stays behind the guide tube 61. Because of the spherical design of the gate 58, very little translation motion is required to clear the seat 75 and allow gate rotation without rubbing or damaging of the seat. The eccentric displacement is directly opposite to the torsion beam, and is relatively small, only a 0.125 center displacement is required for an 18 inch valve. This consequently results in a very low lateral displacement of the gate at the maximum angle of 30° and no sliding at final pressure closing, translation being virtually in a straight line and produced by the eccentric portions of the translation shafts.

Figure 10:
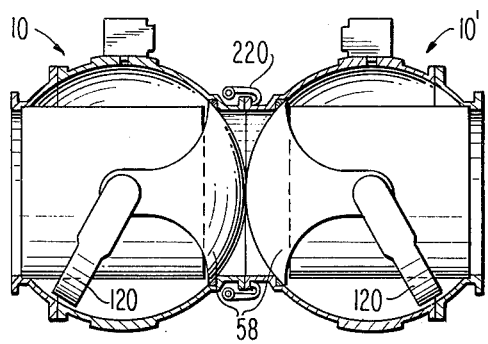
FIG. 10 is a similar sectional view to that of FIGS. 8 and 9 with both valves moved to valve closed position prior to disconnect.
Figure 11:
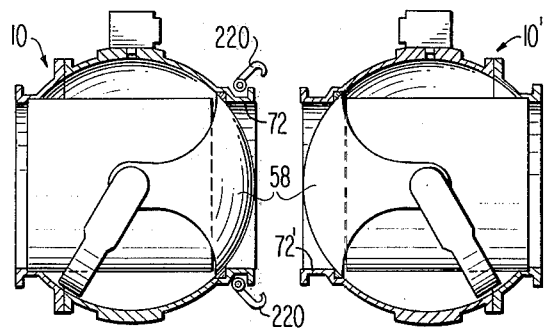
FIG. 11 is a sectional view of the valves of FIGS. 8 through 10, disconnected and in valve closed position.
Figure 5:
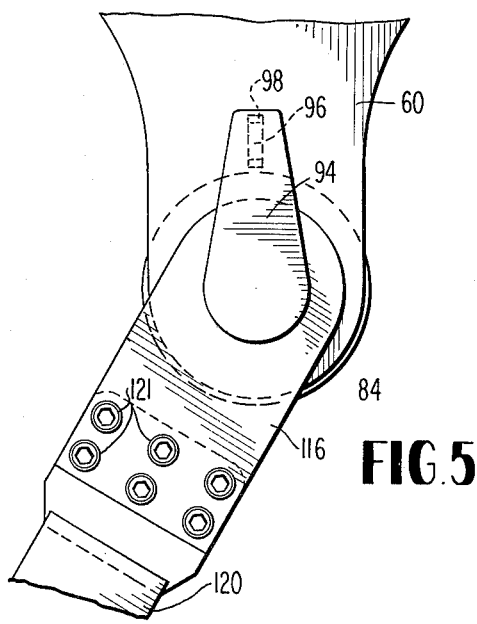
FIG. 5 is an enlarged elevational view of a portion of the valve shown in FIG. 3 taken about line 5—5.

The disconnect separation sequence is additionally shown in FIGS. 10 and 11. The two valves are shown coupled together and moved from open to closed position in the sequence of FIGS. 8–10. While both valves are shown as closing in unison, if there is flow through the unit, it is desirable to close the upstream valve first, then close the downstream valve on signal that the upstream valve is closed. Once full closure of both valves is obtained as seen in FIG. 10, a further sequencing valve or signal (not shown) actuates the actuators 246 for the latches 220 to release and allow the two valves 10 and 10′ to separate. The latches 220 first release their preload and then flip out of the way to allow separation in any direction as shown in FIG. 11. The present design permits each valve unit to close in 500 milleseconds or one-half second for an 18 inch valve. Even where one valve closes prior to the other, the entire sequence of separation of valve closure and separation may occur in less than 1½ seconds. Power requirements are very low and are probably less than 5% of those required for a conventional gate valve with the rate being very low in proportion. The pressure drop through the valve and disconnect of the present invention is an absolute minimum. Another advantage of the disconnect is that no axial movement is required to effect separation and direct lateral motion can occur as soon as the latches are released.

The present invention has application to long distance petroleum pipelines such as the Trans-Alaska Pipeline. The valve design in the present invention is believed ideal for such applications either in terms of a remote control or automatic safety valve in the event of leak or rupture of the pipeline. The fluid pressure necessary to operate the fluid motor such as actuator 246 and the long stroke and short stroke fluid motors 155 and 156 may come from the line oil pressure or alternatively electrically from a relatively low power battery source. The valves could be arranged to respond to a pressure drop due to a break or rupture and automatically close, isolating portions of the line. If necessary, a feedback system could be incorporated to control the speed of closure to prevent over pressure from deceleration of the pipeline flow from exceeding predetermined limits. The system could also alert upstream valves to close to assist in the stoppage of the flow. Since the operating parts are all enclosed, and environmental conditions would have no effect on the valves, the number of applications to which the valve and the quick disconnect may be applied are too numerous to list, but fields such as oil exploration activity, irrigation and hydraulics in general highlight possible applications.

What is claimed is:

1. In a swinging gate valve of the type wherein a spherical gate is pivoted within a spherical valve housing from a first axially in-line position with respect to an annular valve seat to a second valve open position at an angle thereto and outside of the axial flow path through the seat opening and means are provided for axially shifting said gate relative to said seat when in axial alignment with said opening to fully close said valve, the improvement wherein said means for axially shifting said gate comprises:

opposed, aligned, eccentric driving and driven shaft means carried by said housing to each side of said flow path and being coupled to and supporting said gate for rotation about the axes of said shaft means, torsion beam means coupled at its ends to respective driving and driven eccentric shaft means for forcibly rotating said driven eccentric shaft means upon rotation of said driving shaft means to cam said gate axially toward said valve seat, means for resisting rotation of said driven shaft, and means for driving said driving shaft means.

2. The swinging spherical gate valve as claimed in claim 1, wherein: said shaft means each includes arms extending radially therefrom outside of said flow path and fixed to respective sides of said valve gate, and said torsion beam comprises an arcuate member spanning said housing interior thereof and to the side of said flow path opposite that of said valve gate and being coupled at respective ends, to said driving and driven eccentric shaft means.

3. The swinging spherical gate valve as claimed in claim 2, wherein said means for pivoting said gate and for shifting said gate axially comprise concentric shafts at one side of said housing with one of said concentric shafts comprising said eccentric driving shaft means, and wherein said means for resisting rotation of said driven shaft means comprises locking means for selectively locking one of said concentric shafts against rotation while permitting the other to rotate and vice versa.

4. The swinging spherical gate valve as claimed in claim 3, wherein a gate rotating lever is fixedly coupled to one of said concentric shafts and extends radially therefrom and a translation lever is fixedly coupled to said other concentric shaft and extends radially therefrom and to the side of said gate rotating lever.

5. The swinging spherical gate valve as claimed in claim 4, wherein; said means for pivoting said gate and axially shift said gate further comprise first and second reciprocating fluid motors and link means operatively coupling said motors to said gate rotating lever and said translation lever respectively, and wherein said link means coupling one of said reciprocating motors to said gate rotating lever comprises a turnbuckle to adjust the extent of arcuate movement of said valve gate between said first and second rotary positions.

6. The swinging spherical gate valve as claimed in claim 5, wherein each reciprocating fluid motor includes at least one return spring for biasing said motors to positions where said valve is fully open.

7. The swinging spherical gate valve as claimed in claim 4, wherein; said locking means comprises: a shuttle bar guide fixed with respect to said valve housing and positioned between said gate rotating lever and said translation lever and to one side of said concentric shafts, corresponding slots carried within said shuttle bar guide and respective levers, said levers being movable selectively to positions wherein selecting slots are in alignment, and a shuttle bar carried by said shuttle bar guide slot and slidable therein to positions such that portions are located respectively within said shuttle bar guide and one of said levers to alternately lock said gate rotary lever in a fixed position while releasing the translation lever, and vice versa.

8. The swinging spherical gate valve as claimed in claim 5, wherein; said locking means comprises: a shuttle bar guide fixed with respect to said valve housing and positioned between said gate rotating lever and said translation lever and to one side of said concentric shafts, corresponding slots carried within said shuttle bar guide and respective levers, said levers being movable selectively to positions wherein said slots are in alignment, and a shuttle bar carried by said shuttle bar guide slot and slidable therein to positions such that portions are located respectively within said shuttle bar guide and one of said levers to alternately lock said gate rotary lever in a fixed position while releasing the translation lever, and vice versa.

9. The swinging spherical gate valve as claimed in claim 6, wherein; said locking means comprises: a shuttle bar guide fixed with respect to said valve housing and positioned between said gate rotating lever and said translation lever and to one side of said concentric shafts, corresponding slots carried within said shuttle bar guide and respective levers, said levers being movable selectively to positions wherein said slots are in alignment, and a shuttle bar carried by said shuttle bar guide slot and movable therein to positions such that portions are located respectively within said shuttle bar guide and one of said levers to alternately lock said gate rotary lever in a fixed position while releasing the translation lever, and vice versa.

10. The swinging spherical gate valve as claimed in claim 2, wherein; said driving shaft means on said one side of said housing comprises an inner gate rotating shaft and an outer eccentric translation shaft concentrically carried thereby, said inner gate rotating shaft includes an integral radially extending gate rotation drive arm and said gate pivot arm rotatably carried by said eccentric gate translating shaft carries a recess receiving said lug such that rotation of said spherical valve gate occurs about the axis of said eccentric shafts on both sides of said valve housing.

11. The swinging spherical gate valve as claimed in claim 7, wherein said gate rotating shaft extends axially beyond said gate translation shaft outside of said valve housing and said gate rotating lever and said gate translation lever are splined to said gate rotating shaft and said gate translation shaft respectively, and said housing and said gate rotating lever and said translation lever comprise integral control plates on a common side of said shaft through which said shuttle bar slots extend.

12. The swinging spherical gate valve as claimed in claim 11, wherein both gate translation shafts include radial projections extending to the side of said valve housing opposite that of said gate, and said arcuate torsion beam is rigidly coupled at its ends to respective radial projections.

13. The swinging spherical gate valve as claimed in claim 1, wherein: said flow path comprises a flow guide tube cantilver fixed to said valve housing and extending axially therethrough to the extent of underlying almost completely said spherical gate when it is positioned outside said flow path, said flow guide tube being coaxial with said annular valve seat and being axially spaced therefrom a distance limited to that necessary for permitting rotary movement of said valve gate to a position in axial alignment with said guide tube and said annular valve seat and therebetween, and for subsequent camming of said gate axially to fully closed position.

14. The swinging spherical gate valve as claimed in claim 4, wherein; said flow path comprises a flow guide tube cantilever fixed to said valve housing and extending axially therethrough and coaxial with said annular valve seat and being spaced therefrom a distance permitting rotary movement of said valve gate to a position in axial alignment with said guide tube and said annular valve seat and positioned therebetween and for subsequent camming to fully closed position.

15. The swinging spherical gate valve as claimed in claim 7, wherein; said flow path comprises a flow guide tube cantilever fixed to said valve housing and extending axially therethrough and coaxial with said annular valve seat and being spaced therefrom a distance permitting rotary movement of said valve gate to a position in axial alignment with said guide tube and said annular valve seat and positioned therebetween and for subsequent camming to fully closed position.

16. The swinging spherical gate valve as claimed in claim 13, wherein; the gate support arm and the radial projections supporting said torsion bar are circumferentially offset with respect to each other such that the torsion bar is maintained in a position between said flow guide tube and said spherical valve housing during complete rotary movement of said valve gate between said first and said second rotary positions.

17. The swinging spherical gate valve as claimed in claim 13, wherein; said spherical valve housing comprises a two part housing including a first section of relatively short length with respect to the axial flow path and said flow guide tube is fixed to the short length section and extends the major length of the longer section, whereby separating the two part housing permits ready access to the valve gate and the torsion bar by the absence of the flow guide tube.

* * * * *